United States Patent [19]
Asakura et al.

[11] Patent Number: 4,956,320
[45] Date of Patent: Sep. 11, 1990

[54] POSITIVE TEMPERATURE COEFFICIENT SEMICONDUCTOR CERAMIC

[75] Inventors: Masahiro Asakura; Akihiko Igawa, both of Kami, Japan

[73] Assignee: Kurabe Industrial Co., Ltd., Shizuoka, Japan

[21] Appl. No.: 309,657

[22] Filed: Feb. 13, 1989

[30] Foreign Application Priority Data

Mar. 1, 1988 [JP] Japan .................................. 63-48417

[51] Int. Cl.$^5$ ............................................ C04B 35/46
[52] U.S. Cl. ..................................... 501/137; 501/139
[58] Field of Search ................................ 501/137, 139

[56] References Cited

U.S. PATENT DOCUMENTS 4,096,098  6/1978  Umeya et al. ....................... 252/520
4,483,933 11/1984  Kobayashi et al. ................. 501/138
4,736,230  4/1988  Kumagai et al. ..................... 357/10

Primary Examiner—Mark L. Bell
Assistant Examiner—Deborah Jones
Attorney, Agent, or Firm—Spencer & Frank

[57] ABSTRACT

A positive temperature coefficient semiconductor ceramic is prepared by adding from 0.2 to 12 mole % of silicon monoxide to a barium titanate family semiconductor ceramic which has been made into a semiconductor by the addition of a trace amount of a semiconductor agent.

6 Claims, 4 Drawing Sheets

F I G. I

POSITIVE TEMPERATURE COEFFICIENT SEMICONDUCTOR CERAMIC

BACKGROUND OF THE INVENTION

1. Field of the Invention

The present invention relates to a positive temperature coefficient semiconductor ceramic, and more particularly, to a positive temperature coefficient semiconductor ceramic in which low resistance and excellent resistance/temperature characteristics are obtained with good reproducibility, and which also exhibits a large withstand voltage. 2. Description of the Related Art It is known that a positive temperature coefficient semiconductor ceramic may be produced by adding a trace amount of one of the rare-earth elements, Nb, Ta, Bi, Sb or W to a barium titanate family ceramic.

It is also known that the rate at which the resistance of the positive temperature coefficient semiconductor ceramic changes with temperature may be increased by adding manganese Mn to such a positive temperature coefficient semiconductor ceramic. Addition of Mn, however, causes the resistivity of the resultant positive temperature coefficient semiconductor ceramic to increase. To prevent this, it is widely practiced to add silicon dioxide $SiO_2$ to the positive temperature coefficient semiconductor ceramic together with Mn.

Further, it is also known that the withstand voltage may be improved by substituting part of the Ba contained in the barium titanate semiconductor ceramic with calcium Ca.

However, the amount of $SiO_2$ that can be added is limited to between 0.2 and 3.5 mole %, because 0.2 mole % $SiO_2$ or less is not enough to reduce the resistivity and 3.5 mole % $SiO_2$ or more makes the resultant positive temperature coefficient semiconductor ceramic vitreous and increases the resistivity thereof. These factors in turn limit the amounts of elements that can be added to the ceramic in efforts to improve the characteristics, such as Mn which is used to improve the resistance/temperature characteristics or Ca which is added to improve the withstand voltage.

More specifically, though the characteristics of the ceramic may be improved by the addition of the elements that are effective to improve the characteristics, such as Mn or Ca, addition of these elements causes the resistivity of the resultant semiconductor ceramic to increase. To prevent this, $SiO_2$ may be added to the ceramic together with any of these elements. However, the addition of $SiO_2$ in an amount of 3.5 mole % or more makes the resultant semiconductor ceramic vitreores, as well as increases the resistivity thereof. Thus, it is only possible to add the elements used to improve the characteristics such as Mn and Ca in amounts that correspond to the content of $SiO_2$ which is effective in reducing the resistivity.

SUMMARY OF THE INVENTION

Accordingly, an object of the present invention is directed to obviating the aforementioned problems of the prior art by providing a positive temperature coefficient semiconductor ceramic which displays low resistance, excellent resistance/temperature characteristics and a high withstand voltage.

To this end, the present invention provides a positive temperature coefficient semiconductor ceramic in which from 0.2 to 12 mole % of silicon monoxide is added to a barium titanate type semiconductor ceramic which has been made into a semiconductor by the addition of a trace amount of an additive.

In the present invention, silicon monoxide is added to a barium titanate type semiconductor ceramic to produce a positive temperature coefficient semiconductor ceramic. This enables the amount of Mn or Ca added to be increased to the level which conventionally causes the resultant ceramic to become an electrical insulator; Mn being added to improve the temperature coefficient of resistance in the resistance/temperature characteristics and Ca being added to improve the withstand voltage. This results in the production of a positive temperature coefficient semiconductor ceramic which exhibits a greatly improved temperature coefficient of resistance and withstand voltage and in which low resistance is obtained with good reproducibility.

DETAILED DESCRIPTION OF THE PREFERRED EMBODIMENTS

Embodiments of the present invention will be described below in detail in connection with comparative samples.

$BaCO_3$, $CaCO_3$, $TiO_2$ and $Y_2O_3$ were combined in various amounts listed in Table 1 attached to this detailed description of this invention to prepare various mixtures. The mixtures thus-prepared were mixed together with agate balls for 12 to 20 hours in a pot made of polyethylene, and were then fired at a temperature ranging from 950° to 1100° C. for 1 hour and 30 minutes.

MnO, $SiO_2$ and SiO were added to the fired powder mixtures in various amounts listed in Table 1, and the resultant mixtures were acted upon by agate balls for 12 to 20 hours in the pot made of polyethylene.

Next, an aqueous solution of polyvinyl alcohol was added to each of the powder mixtures as a binder, and the mixtures were ground so that the particles have a size represented by 30 to 150 mesh. These mixtures were then shaped into disks having a diameter of 20 mm and a thickness of 3 mm using a die and a hydraulic press.

The disk-shaped mixtures thus-prepared were fired at a temperature ranging from 1250° to 1350° C. for 1 to 2 hours.

An ohmic contact type electrode of silver was pasted on each of the two sides of each of the fired samples, and the 29 different samples shown in Table 1 were thus prepared, including those representing the embodiments of the present invention.

Table 2 shows the results of measurements of the normal temperature resistitivity ($\rho 25$), the temperature coefficient of resistance ($\alpha$) and the withstand voltage coefficient (a 100–200 V), which were conducted on these samples.

The normal temperature resistivity ($\rho 25$), the maximum resistivity ($\rho max$), the temperature coefficient of resistance ($\alpha$), the PTC index and the withstand voltage coefficient [a (100–200 V)] are defined as follows:

Normal temperature resistivity ($\rho 25$) ... resistivity at a temperature of 25°C. [$\Omega cm$]

Maximum resistivity ($\rho max$) ... maximum resistivity [$\Omega cm$]

Figure 4:
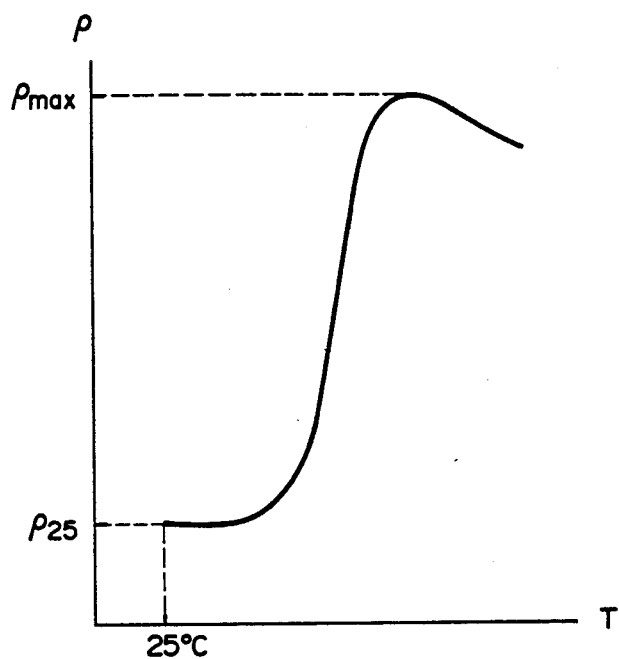
FIG. 4 is a graph showing the relationship between the temperature and the resistivity.

See FIG. 4.

Temperature coefficient of resistance ($\alpha$) ... $2.303 \times [(\log R_2/R_1)/(T_2-T_1)] \times 100$ [%/°C]

$T_1$: temperature at which the resistance becomes twice that obtained at 25° C.

$R_1$: resistance at temperature $T_1$ $T_2$: temperature higher than $T_1$ by 20° C.

$R_2$: resistance at temperature $T_2$

PTC (positive temperature coefficient index) ... PTC = $\log (\rho max/\rho 25)$ See FIG. 4. Generally, the larger this index, the better.

Withstand voltage coefficient a (100–200 V) ... $|\log (I\ 200\ V/I\ 100\ V)/\log (200/100)|$ I 100 V: stable current value obtained when 100 V is applied I 200 V: stable current value obtained when 200 V is applied

[Sample Nos. 1 to 7]

These represent known positive temperature coefficient semiconductors in which $Y_2O_3$ was added to barium titanate in amounts ranging between 0.1 mole % and 1.2 mole % to make the barium titanate into a semiconductor.

The positive temperature coefficient semiconductor Sample No. 3] which contained 0.3 mole % of $Y_2O_3$ exhibited the lowest normal temperature resistivity ($\rho 25$) of $1.4 \times 10\ \Omega cm$, which is a sufficiently small level. However, the PTC indexes of the resistance/temperature characteristics contained from one to three significant digits, and were impractically small.

[Sample Nos. 8 to 11]

These represent positive temperature coefficient semiconductors in which MnO was added to the barium titanate type semiconductors containing 0.3 mole % of $Y_2O_3$, which ensured the lowest resistivity. The amounts of MnO added ranged from 0.05 mole % to 0.1 mole %. Though Sample No. 10 displayed the PTC index containing five significant digits and the gradient $\alpha$ of about 20, these values are still too low compared to practical levels. Sample No. 11 represents a ceramic to which an increased amount of Mn was added in 1 order to improve $\alpha$. However, the resistivity of the resultant ceramic became infinitely large, and the manufactured ceramic could not be made into a semiconductor.

[Sample Nos. 12 to 17]

These represent ceramics in which 2.85 mole % of $SiO_2$ was added to reduce the resistivity. As can be seen from Table 2, the addition of MnO and $SiO_2$ makes Sample No. 7 into a semiconductor, which could not be made into a semiconductor by the addition of 1.2 mole % of $Y_2O_3$. When the amount of MnO added exceeded 0.14 mole %, the resistivities of the resultant ceramics began to increase, although $\alpha$ of the resultant ceramics exceeded 40%. Further, the withstand voltages a (100–200 V) remained below 0.8, which is impractically low.

[Sample Nos. 18 to 23]

These represent the embodiments of the present invention which contain SiO in place of $SiO_2$, which was employed in Sample Nos. 12 to 17. As is clear from Table 2, the resistivities $\rho 25$ became one order in magnitude smaller than those of Sample Nos. 12 to 17. Further, the withstand voltages a (100–200 V) increased.

[Sample Nos. 24 to 26]

These represent the ceramics in which Ca was added to the ceramics containing $SiO_2$ in order to improve the withstand voltage. Though the addition of Ca causes the withstand voltages to slightly improve, it greatly increases the resistivity.

[Sample Nos. 27 to 29]

These represent the embodiments of the present invention. When Ca was added to the semiconductor ceramics containing SiO, the withstand voltages a (100–200 V) rapidly increased to a practical value without the resistivities thereof being raised.

Figure 3:
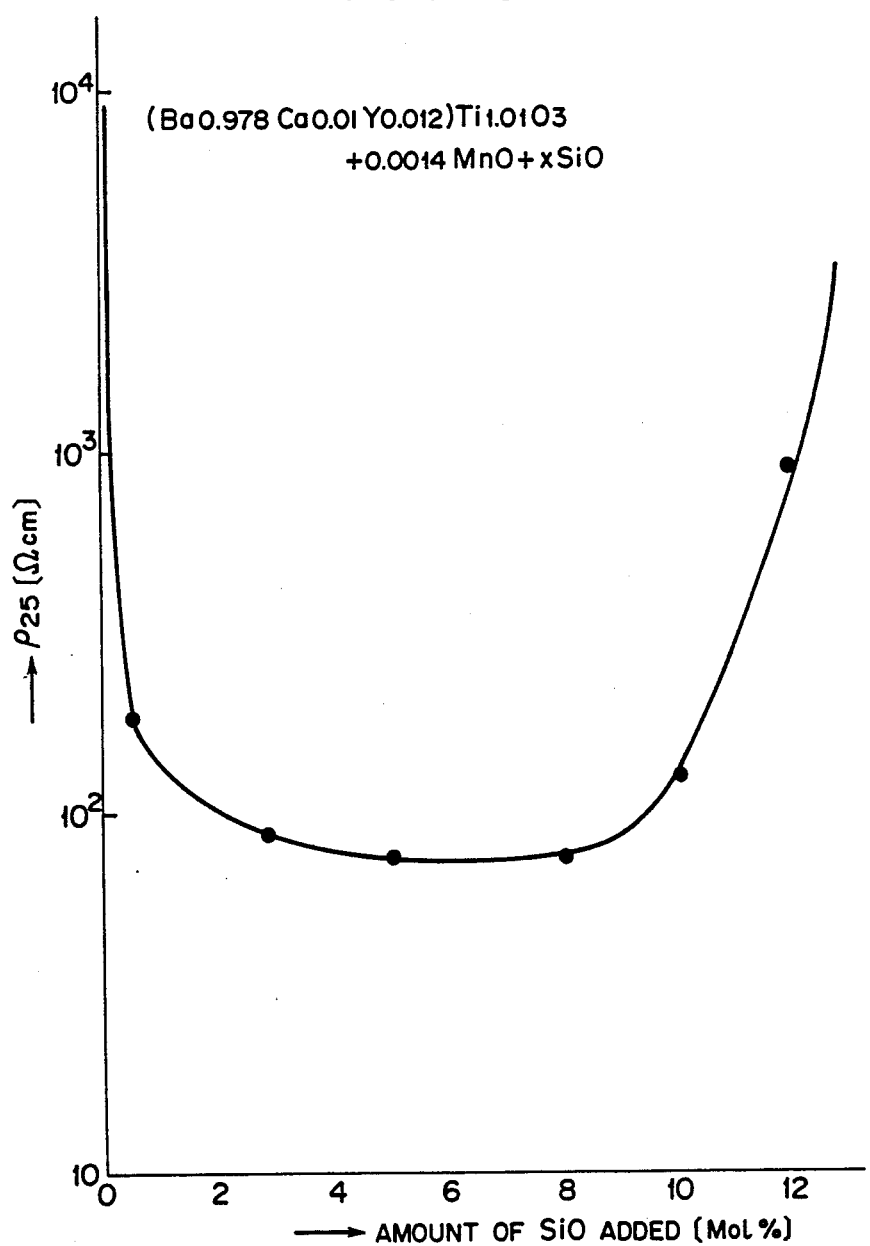
FIG. 3 shows the relationship between the amount of SiO which is added to a barium titanate type semiconductor ceramic and the resistivity thereof.

FIG. 3 is a graph showing how the resistivity of the semiconductor ceramic formed from the same materials as those of Sample No. 27 changes as the amount of SiO contained changes from 0 to 12 mole %.

As is apparent from the graph, when the amount of silicon monoxide SiO added to the barium titanate type semiconductor ceramic, which has been made into a semiconductor by the addition of a trace amount of an additive and which contains Mn and Ca, is between 0.2 mole % and 12 mole %, the ceramic exhibits a low $\rho 25$.

As will be understood from the foregoing description, in the present invention, SiO is added to the barium titanate type semiconductor ceramic which has been made into a semiconductor by the addition of a trace amount of a semiconductor agent. In consequence, the further addition of Mn and Ca then enables the resistance/temperature characteristics and the withstand voltage of a resultant ceramic to be improved without raising the resistivity thereof.

Figure 1:
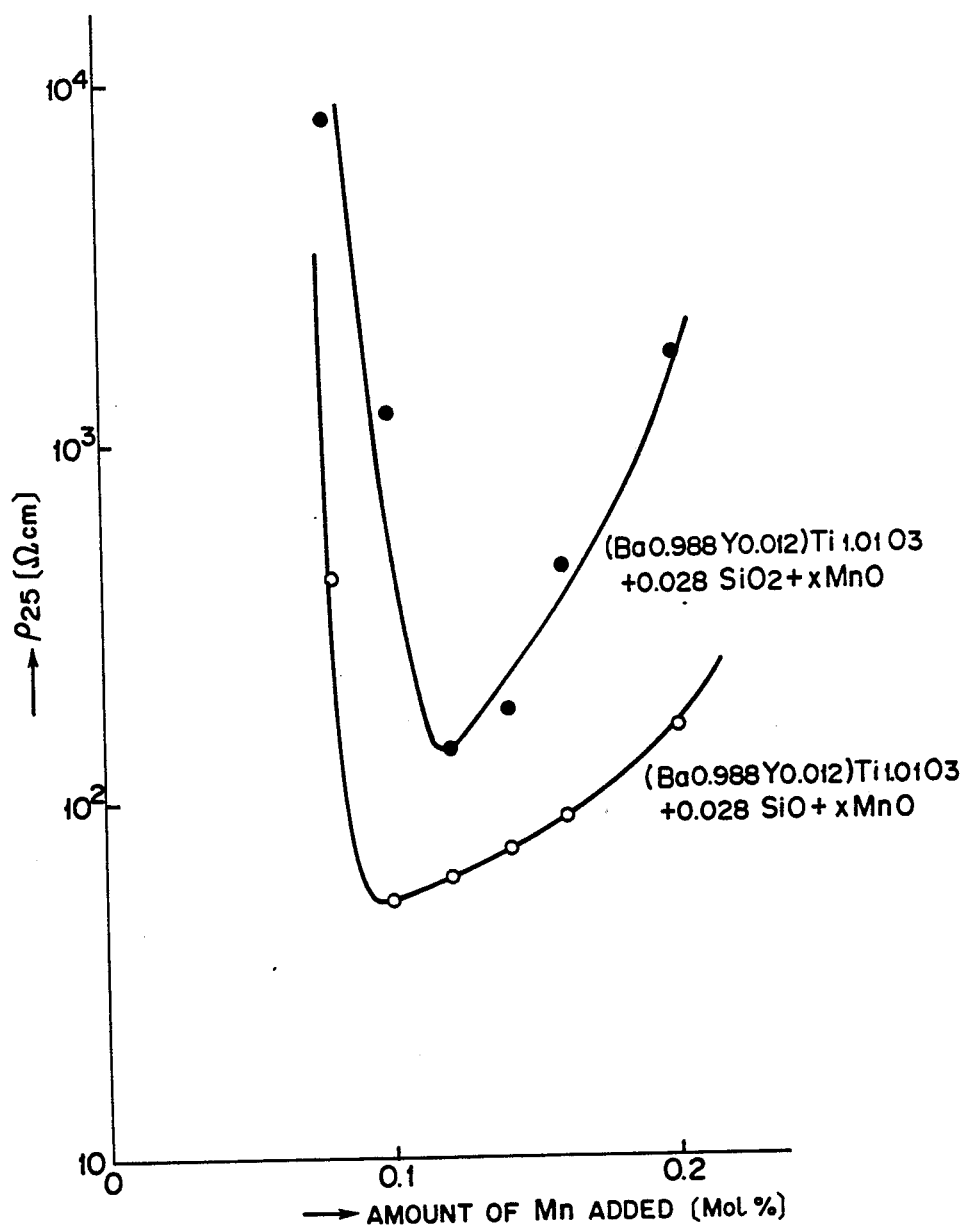
FIG. 1 shows the relationship between the amount of Mn added to a barium titanate type semiconductor ceramic and the resistivity thereof.
Figure 2:
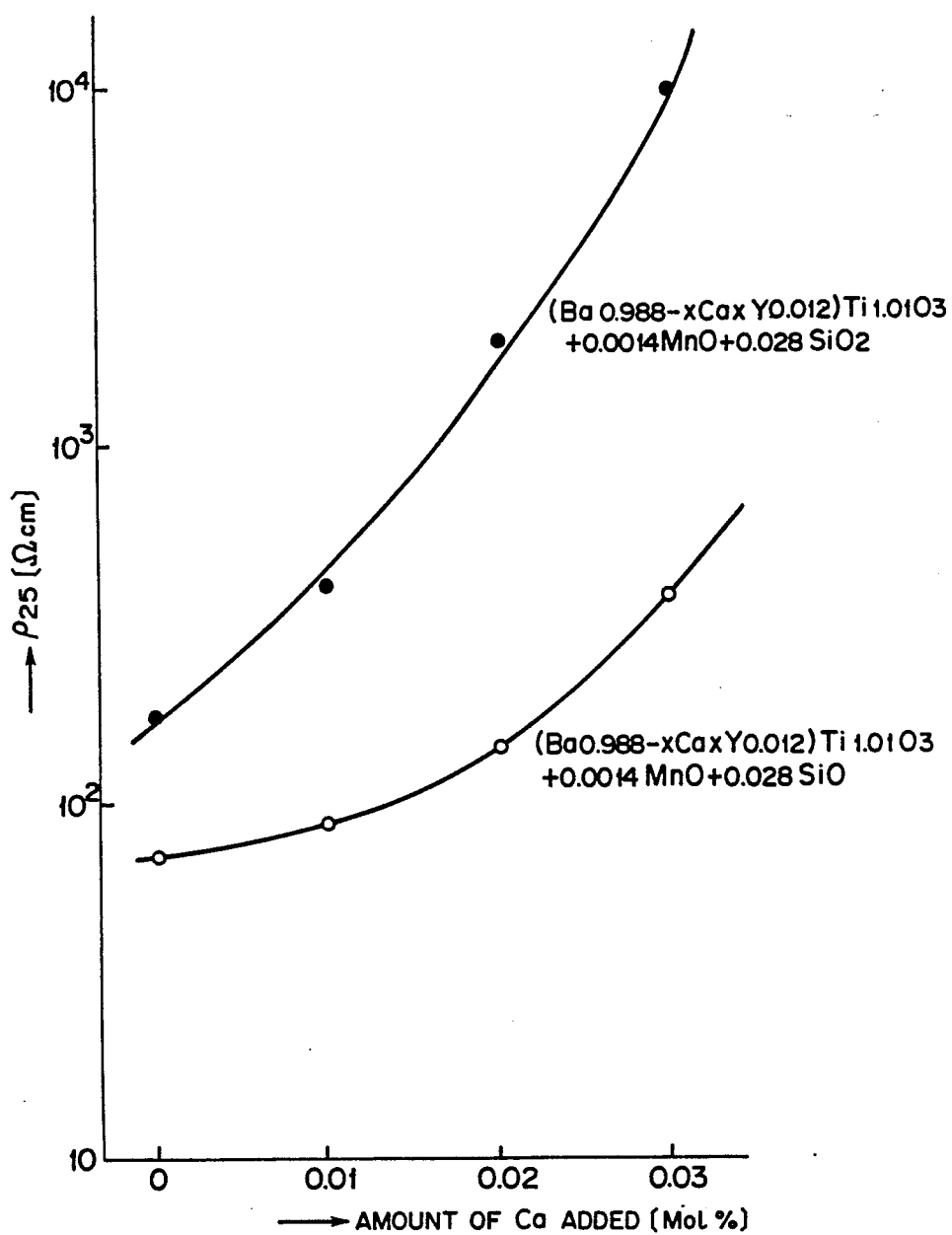
FIG. 2 shows the relationship between the amount of Ca added to a barium titanate type semiconductor ceramic and the resistivity thereof.

FIG. 1 is a graph showing how the resistivities of the semiconductor ceramics respectively containing $SiO_2$ and SiO change as the amount of Mn added does. FIG. 2 is a graph showing how the resistivities of the semiconductor ceramics respectively containing $SiO_2$ and SiO change as the amount of Ca added changes.

It is clear from the graphs that the addition of SiO is more effective in reducing the resistivity than the addition of $SiO_2$. Further, the addition of SiO allows the resistivity to be changed at a smaller rate as the amounts of Mn and Ca change than that at which the resistivity of the ceramic containing $SiO_2$ changes.

The addition of SiO can eliminate unstable conditions in which the resistivity changes greatly as the amount of Mn or Ca added does or in which low resistivity cannot be obtained with good reproducibility, and enables provision of a semiconductor ceramic having a low resistivity and stable characteristics.

In the positive temperature coefficient semiconductor ceramic according to the present invention, the amount of SiO that can be added ranges between 0.2 mole % and 12 mole %, because less than 0.2 mole % SiO is not enough to reduce the resistivity and more than 12 mole % SiO makes the resultant semiconductor ceramic vitreous and increases the resistivity thereof.

Whereas the amount of $SiO_2$ that can be added is limited to between 0.2 mole % and 3.5 mole %, the amount of SiO added can be set to a value of from 0.2 mole % to 12 mole %. This enables the amount of Mn and Ca added to improve the characteristics to be increased, thereby improving the resistance/temperature characteristics and the withstand voltage.

Although in the above-described embodiments Mn and Ca are used to improve the characteristics of the semiconductor ceramic, elements that are effective in improving various other characteristics, such as Al, Li and Rb, may also be employed.

The above-described embodiments of the present invention employ yttrium Y as an element that makes a ceramic into a semiconductor. However, other elements that can make a ceramic into a semiconductor, such as Sb, Bi or Nb, may also be used.

Further, suitable barium titanate type semiconductor ceramics to which the present invention can be applied include those that contain Pb, Sr, Sn or Zr, which is effective in moving the Curie point of the ceramic.

TABLE 1

| Sample No. | $BaCO_3$ | $CaCO_3$ | $TiO_2$ | $Y_2O_3$ | MnO | $SiO_2$ | SiO |
|---|---|---|---|---|---|---|---|
| 1 | 99.9 | 0 | 101 | 0.1 | 0 | 0 | 0 |
| 2 | 99.8 | " | " | 0.2 | " | " | " |
| 3 | 99.7 | " | " | 0.3 | " | " | " |
| 4 | 99.6 | " | " | 0.4 | " | " | " |
| 5 | 99.5 | " | " | 0.5 | " | " | " |
| 6 | 99.4 | " | " | 0.6 | " | " | " |
| 7 | 98.8 | " | " | 1.2 | " | " | " |
| 8 | 99.7 | 0 | 101 | 0.3 | 0.05 | 0 | 0 |
| 9 | " | " | " | " | 0.06 | " | " |
| 10 | " | " | " | " | 0.07 | " | " |
| 11 | " | " | " | " | 0.1 | " | " |
| 12 | 98.8 | 0 | 101 | 1.2 | 0.08 | 2.85 | 0 |
| 13 | " | " | " | " | 0.1 | " | " |
| 14 | " | " | " | " | 0.12 | " | " |
| 15 | " | " | " | " | 0.14 | " | " |
| 16 | " | " | " | " | 0.16 | " | " |
| 17 | " | " | " | " | 0.2 | " | " |
| 18 | 98.8 | 0 | 101 | 1.2 | 0.08 | 0 | 2.85 |
| 19 | " | " | " | " | 0.1 | " | " |
| 20 | " | " | " | " | 0.12 | " | " |
| 21 | " | " | " | " | 0.14 | " | " |
| 22 | " | " | " | " | 0.16 | " | " |
| 23 | " | " | " | " | 0.2 | " | " |
| 24 | 97.8 | 1 | 101 | 1.2 | 0.14 | 2.85 | 0 |
| 25 | 96.8 | 2 | " | " | " | " | " |
| 26 | 95.8 | 3 | " | " | " | " | " |
| 27 | 97.8 | 1 | 101 | 1.2 | 0.14 | 0 | 2.85 |
| 28 | 96.8 | 2 | " | " | " | " | " |
| 29 | 95.8 | 3 | " | " | " | " | " |

TABLE 2

| Sample No. | $\rho 25$ | $\alpha$ | a |
|---|---|---|---|
| 1 | $4.6 \times 10^3$ | — | |
| 2 | $1.5 \times 10$ | — | |
| 3 | $1.4 \times 10$ | — | |
| 4 | $8.0 \times 10$ | — | |
| 5 | $1.3 \times 10^3$ | — | |
| 6 | $3.2 \times 10^4$ | — | |
| 7 | $\infty$ | | |
| 8 | $1.1 \times 10^2$ | 15 | |
| 9 | $2.8 \times 10^2$ | 17.8 | |
| 10 | $6.4 \times 10^3$ | 19.4 | |
| 11 | $\infty$ | — | |
| 12 | $7.3 \times 10^3$ | 39 | 0.71 |
| 13 | $1.2 \times 10^3$ | 38 | 0.71 |
| 14 | $1.4 \times 10^2$ | 38 | 0.73 |
| 15 | $1.8 \times 10^2$ | 40 | 0.78 |
| 16 | $4.5 \times 10^2$ | 43 | 0.78 |
| 17 | $1.7 \times 10^3$ | 45 | 0.79 |
| 18 | $4.2 \times 10^2$ | 48 | 0.82 |
| 19 | $5.3 \times 10$ | 38 | 0.79 |
| 20 | $6.2 \times 10$ | 39 | 0.79 |
| 21 | $7.4 \times 10$ | 45 | 0.80 |
| 22 | $9.1 \times 10$ | 48 | 0.81 |
| 23 | $1.6 \times 10^2$ | 49 | 0.83 |
| 24 | $4.3 \times 10^2$ | 48 | 0.82 |
| 25 | $2.0 \times 10^3$ | 62 | 0.84 |
| 26 | $9.8 \times 10^3$ | 74 | 0.86 |
| 27 | $9.2 \times 10$ | 47 | 0.83 |
| 28 | $1.5 \times 10^2$ | 60 | 0.86 |
| 29 | $4.1 \times 10^2$ | 71 | 0.89 |

What is claimed is:

1. A positive temperature coefficient semiconductor ceramic, comprising:
   from 0.2 to 12 mole % of silicon monoxide added to a barium titanate semiconductor ceramic which has been made into a semiconductor by the addition of a trace amount of a semiconductor agent selected from the group consisting of a rare-earth element, Ta, W, Y, Sb, Bi, and Nb.

2. A positive temperature coefficient semiconductor ceramic, comprising:
   from 0.2 to 12 mole % of silicon monoxide, and a manganese containing barium titanate semiconductor ceramic which has been made into a semiconductor by the addition of a trace amount of a semiconductor agent selected from the group consisting of a rare-earth element, Ta, W, Y, Sb, Bi, and Nb.

3. A positive temperature coefficient semiconductor ceramic, comprising:
   from 0.2 to 12 mole % of silicon monoxide, and a manganese and calcium containing barium titanate semiconductor ceramic which has been made into a semiconductor by the addition of a trace amount of a semiconductor agent selected from the group consisting of a rare-earth element, Ta, W, Y, Sb, Bi, and Nb.

4. The positive temperature coefficient semiconductor according to claim 1, wherein the barium titanate semiconductor ceramic comprises a barium titanate selected from the group consisting of barium titanate and barium titanate containing an element selected from the group consisting of Pb, Si, Sn and Zr.

5. The positive temperature coefficient semiconductor according to claim 2, wherein the barium titanate semiconductor ceramic comprises a barium titanate selected from the group consisting of barium titanate and an element selected from the group consisting barium titanate containing of Pb, Si, Sn and Zr.

6. The positive temperature coefficient semiconductor according to claim 3, wherein the barium titanate semiconductor ceramic comprises a barium titanate selected from the group consisting of barium titanate well and barium titanate containing an element selected from the group consisting of Pb, Si, Sn and Zn.

* * * * *